(12) United States Patent
Hayashizaka et al.

(10) Patent No.: US 11,955,258 B2
(45) Date of Patent: Apr. 9, 2024

(54) LAMINATE OF CONDUCTOR AND INSULATING COATING, COIL, ROTATING ELECTRIC MACHINE, INSULATING PAINT, AND INSULATING FILM

(71) Applicants: SUMITOMO SEIKA CHEMICALS CO., LTD., Hyogo (JP); HIDE TECHNOLOGY, LLC, Hitachi (JP)

(72) Inventors: Noriyuki Hayashizaka, Hyogo (JP); Seiji Bando, Hyogo (JP); Hideyuki Kikuchi, Hitachi (JP)

(73) Assignees: SUMITOMO SEIKA CHEMICALS CO., LTD., Hyogo (JP); HIDE TECHNOLOGY, LLC, Hitachi (JP)

( * ) Notice: Subject to any disclaimer, the term of this patent is extended or adjusted under 35 U.S.C. 154(b) by 0 days.

(21) Appl. No.: 17/250,771

(22) PCT Filed: Mar. 27, 2019

(86) PCT No.: PCT/JP2019/013120
§ 371 (c)(1),
(2) Date: Mar. 2, 2021

(87) PCT Pub. No.: WO2020/049784
PCT Pub. Date: Mar. 12, 2020

(65) Prior Publication Data
US 2021/0202128 A1   Jul. 1, 2021

(30) Foreign Application Priority Data
Sep. 3, 2018   (JP) ................. 2018-164717

(51) Int. Cl.
*H01B 7/02* (2006.01)
*C09D 7/61* (2018.01)
(Continued)

(52) U.S. Cl.
CPC ............ *H01B 7/0216* (2013.01); *C09D 7/61* (2018.01); *H01B 3/302* (2013.01); *H01B 3/308* (2013.01);
(Continued)

(58) Field of Classification Search
CPC ............................... H01B 3/00; H01B 7/0208
See application file for complete search history.

(56) References Cited

U.S. PATENT DOCUMENTS

| 5,654,095 A | 8/1997 | Yin et al. |
| 2003/0232144 A1 | 12/2003 | Kikuchi et al. |

(Continued)

FOREIGN PATENT DOCUMENTS

| CA | 2991696 | * | 1/2017 |
| EP | 2371536 A1 | | 10/2011 |

(Continued)

OTHER PUBLICATIONS

International Search Report for PCT/JP2019/013120 dated May 28, 2019.
(Continued)

*Primary Examiner* — Chau N Nguyen
(74) *Attorney, Agent, or Firm* — Knobbe Martens Olson & Bear LLP

(57) ABSTRACT

There is provided a laminate having excellent partial discharge resistance. A laminate of a conductor and an insulating coating comprising a conductor and an insulating coating formed on the conductor, wherein the insulating coating is formed of a resin composition containing a metal oxide hydrate, and an inorganic insulating layer is formed on the insulating coating when the laminate is exposed to partial discharge caused by inverter surges.

10 Claims, 6 Drawing Sheets

(51) Int. Cl.
    *H01B 3/30* (2006.01)
    *H01B 3/42* (2006.01)
    *H01F 5/06* (2006.01)
    *C08K 3/22* (2006.01)

(52) U.S. Cl.
    CPC ............... *H01B 3/421* (2013.01); *H01F 5/06* (2013.01); *C08K 3/22* (2013.01); *C08K 2003/2227* (2013.01)

(56) References Cited

U.S. PATENT DOCUMENTS

| | | |
|---|---|---|
| 2006/0240255 A1 | 10/2006 | Kikuchi et al. |
| 2014/0065418 A1 | 3/2014 | Kikuchi et al. |
| 2014/0154407 A1 | 6/2014 | Kikuchi et al. |
| 2018/0201804 A1 | 7/2018 | Hayashizaka et al. |
| 2018/0204648 A1 | 7/2018 | Hayashizaka et al. |
| 2019/0144706 A1 | 5/2019 | Ishikawa et al. |

FOREIGN PATENT DOCUMENTS

| | | |
|---|---|---|
| EP | 3321941 A1 | 5/2018 |
| GB | 2 217 719 A | 11/1989 |
| JP | H02-12904 A | 1/1999 |
| JP | 2001-307557 A | 11/2001 |
| JP | 2006-302835 A | 11/2006 |
| JP | 2014-049397 A | 3/2014 |
| JP | 2017-157463 A | 9/2017 |
| WO | WO 2017/006999 A1 | 1/2017 |
| WO | WO 2017/007000 A1 | 1/2017 |
| WO | WO 2018/025538 A1 | 8/2018 |

OTHER PUBLICATIONS

Partial European Search Report in European Patent Application No. 19857927.8 dated May 3, 2022.

* cited by examiner

SIDE VIEW

LAMINATE OF CONDUCTOR AND INSULATING COATING, COIL, ROTATING ELECTRIC MACHINE, INSULATING PAINT, AND INSULATING FILM

TECHNICAL FIELD

The present invention relates to a laminate of a conductor and an insulating coating, a coil, a rotating electric machine, an insulating paint, and an insulating film.

BACKGROUND ART

Electric wires for use in electrical apparatuses such as motors include insulated electric wires on which an insulating layer is formed by applying to a conductor surface an insulating paint obtained by dissolving a resin such as a polyimide or polyamide-imide or a resin precursor thereof in an organic solvent, followed by baking; and insulated electric wires on which an insulating layer is formed by winding an insulating film such as a polyimide film or mica tape around a conductor (so-called tape wrapping).

In electrical apparatuses with a high operating voltage, such as motors used at a high voltage, high voltage is applied to the insulated electric wires constituting coils. If microvoids are present between adjacent insulated electric wires or in the insulating coating, concentration of electric field may occur at that region, resulting in partial discharge. The partial discharge may cause deterioration of the insulating coating, which may cause premature dielectric breakdown of the coil, leading to a failure of the electrical apparatus.

Furthermore, in recent years, even in apparatuses categorized as the low-voltage-driven type of systems in which motors or the like are driven by inverters used for energy conservation and variable speed, there has been an increasing number of cases where abrupt overvoltages (so-called inverter surges) occur in the drive voltage repeatedly in an extremely short period, leading to dielectric breakdown. The dielectric breakdown is due to partial discharge caused by the overvoltages that occur repeatedly due to the inverter surges.

Methods for improving the electrical insulation lifetime against such partial discharge have been disclosed, such as a method in which an inorganic material formed of a metal oxide or the like is filled to prevent dielectric breakdown due to partial discharge; and a method in which a nano-size inorganic material is applied to achieve both partial discharge resistance and mechanical properties (flexibility and wear resistance) (see, for example, Patent Literatures 1 to 3).

CITATION LIST

Patent Literature

Patent Literature 1: U.S. Pat. No. 5,654,095
Patent Literature 2: JP 2006-302835 A
Patent Literature 3: JP 2001-307557 A

SUMMARY OF INVENTION

Technical Problem

It is a main object of the present invention to provide a laminate of a conductor and an insulating coating that has excellent partial discharge resistance. It is also an object of the present invention to provide a coil formed using the laminate as an insulated electric wire, a rotating electric machine, an insulating paint for forming the laminate, and an insulating film.

Solution to Problem

The present invention provides aspects of the invention comprising the following features:

Item 1. A laminate comprising at least a conductor and an insulating coating, wherein
the insulating coating is formed of a resin composition containing a metal oxide hydrate, and
an inorganic insulating layer is formed on the insulating coating when the laminate is exposed to partial discharge caused by inverter surges.

Item 2. The laminate according to item 1, wherein the metal oxide hydrate is a hydrated alumina.

Item 3. The laminate according to item 1 or 2, wherein the inorganic insulating layer is formed of at least one of a metal oxide and a metal oxide hydrate formed by partial dehydration of the metal oxide hydrate.

Item 4. The laminate according to any one of items 1 to 3, wherein the inorganic insulating layer has a thickness of 10 nm or more.

Item 5. The laminate according to any one of items 1 to 4, further comprising a composite layer formed between the conductor and the inorganic insulating layer.

Item 6. The laminate according to item 5, wherein the composite layer has a thickness of 10 nm or more.

Item 7. The laminate according to any one of items 1 to 6, wherein the resin composition contains the metal oxide hydrate in an amount of 6 to 50 parts by mass per 100 parts by mass of the resin.

Item 8. The laminate according to any one of items 1 to 7, wherein the resin in the resin composition is at least one selected from the group consisting of a formal resin, a polyurethane, an epoxy resin, a polyester, a polyester-imide, a polyetherimide, a polyamide-imide, a polyimide, and precursors thereof.

Item 9. The laminate according to any one of items 1 to 8, wherein the laminate is in the form of an insulated electric wire or a film.

Item 10. A coil comprising the insulated electric wire according to item 9. Item 11. A rotating electric machine comprising the insulated electric wire according to item 9.

Item 12. An insulating paint comprising the resin composition, for producing the laminate according to any one of items 1 to 9.

Item 13. An insulating film formed from the resin composition, for forming the insulating coating of the laminate according to any one of items 1 to 9.

Item 14. A laminate comprising a conductor and an insulating coating, wherein the insulating coating includes an inorganic insulating layer and a composite layer.

Advantageous Effects of Invention

The present invention can provide a laminate of a conductor and an insulating coating that has excellent partial discharge resistance. The present invention can also provide a coil formed using the laminate as an electric wire, a rotating electric machine, and an insulating paint for forming the laminate.

DESCRIPTION OF EMBODIMENTS

A laminate, a coil, a rotating electric machine, an insulating paint, and an insulating film of the present invention will be hereinafter described in detail. As used herein, values connected with "to" refer to the numerical range including the values before and after "to" as the lower and upper limits. When a plurality of lower limits and a plurality of upper limits are mentioned separately, any lower limit and any upper limit may be selected and connected with "to".

The laminate of the present invention comprises at least a conductor and an insulating coating formed on the conductor. In the laminate of the present invention, the insulating coating is formed of a resin composition containing a metal oxide hydrate, and an inorganic insulating layer is formed on the insulating coating when the laminate is exposed to partial discharge caused by inverter surges. The laminate of the present invention can exhibit excellent partial discharge resistance by virtue of these features. The laminate of the present invention also has less migration phenomenon and improved tracking resistance by virtue of these features. The laminate of the present invention will be hereinafter described in detail with reference to FIGS. 1 to 16.

In the present invention, "inverter surge" refers to an abrupt overvoltage superimposed on the drive voltage, which occurs due to switching of an inverter. The switching frequency of an inverter ranges from a relatively low rate of about 1 kHz to a high rate of up to 100 kHz; hence, the frequency of occurrence of inverter surges is also extremely high, from about 1 to 100 kHz. The voltage ranges from a voltage of about 600 V that is superimposed on a drive voltage of 400 V for industrial inverter motors, to a voltage of about 3 kV that is superimposed on the drive voltage of high-voltage-driven inverter motors.

Figure 1:
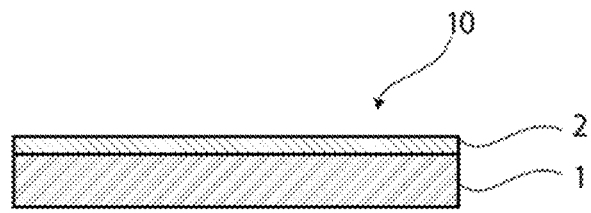
FIG. 1 is a schematic cross-sectional view showing one example of a laminate according to an embodiment of the present invention.
Figure 2:
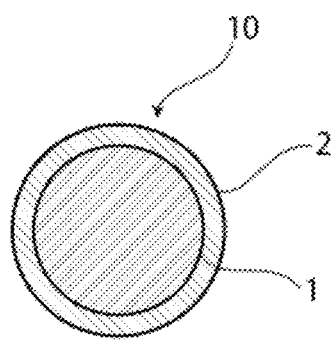
FIG. 2 is a schematic cross-sectional view showing another example of an insulated electric wire according to an embodiment of the present invention.
Figure 3:
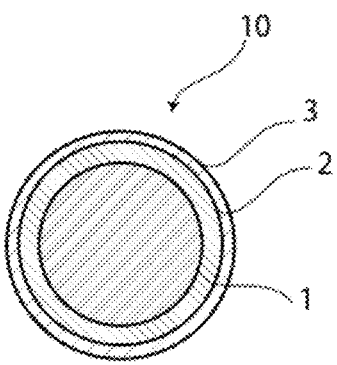
FIG. 3 is a schematic cross-sectional view showing another example of an insulated electric wire according to an embodiment of the present invention.
Figure 4:
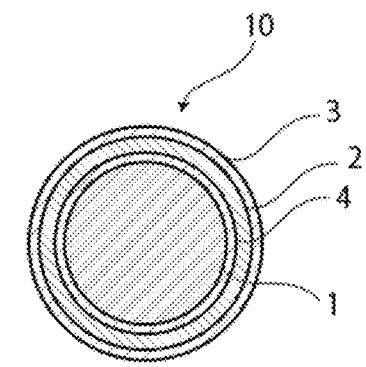
FIG. 4 is a schematic cross-sectional view showing another example of an insulated electric wire according to an embodiment of the present invention.
Figure 5:
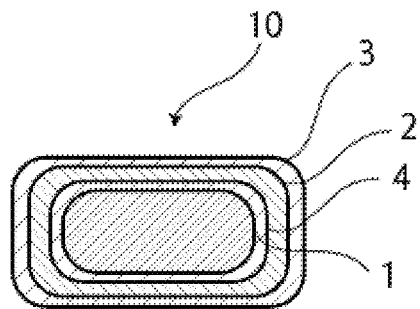
FIG. 5 is a schematic cross-sectional view showing another example of an insulated electric wire according to an embodiment of the present invention.

A laminate 10 of the present invention includes a conductor 1 and an insulating coating 2. As shown in FIG. 1, for example, the laminate 10 of the present invention may be in the form of a film having at least the conductor 1 and the insulating coating 2 laminated on the conductor 1. Alternatively, as shown in FIGS. 2 to 5, for example, the laminate 10 of the present invention may be in the form of an insulated electric wire having a conductor 1 at a central region and an insulating coating 2 formed around the perimeter of the conductor 1. When the laminate 10 of the present invention is in the form of an insulated electric wire, it may have a circular shape, an oval shape, a polygonal shape (which may be a straight angle shape or an irregular shape), or the like in cross section. FIGS. 2 to 4 show insulated electric wires having a circular cross section. FIG. 5 shows an insulated electric wire having a generally rectangular cross section.

As long as the laminate 10 of the present invention includes at least the conductor 1 and the insulating coating 2, it may also include other layers. The other layers include, for example, insulating layers 3 and 4. FIG. 3, for example, shows a laminate 10 (insulated electric wire) including a conductor 1, an insulating coating 2 formed around the conductor 1, and an insulating layer 3 formed around the insulating coating 2. FIGS. 4 and 5 each show a laminate 10 (insulated electric wire) including a conductor 1, an insulating layer 4 formed around the conductor 1, an insulating coating 2 formed around the insulating layer 4, and an insulating layer 3 formed around the insulating coating 2. The materials constituting the insulating layers 3 and 4 may be, for example, the below-described resins having heat resistance (heat-resistant resins).

The insulating layers 3 and 4 may each be formed of the same material as the material of the insulating coating 2, or may each be formed of other material.

The insulating layers 3 and 4 may be formed of the same material or different materials.

The insulating layers 3 and 4 may each be disposed under the insulating coating 2 (i.e., on the conductor 1 side), or may each be disposed over the insulating coating 2 (i.e., the side opposite to the conductor 1).

The other layers also include a plating layer of a metal different from the conductor, which is formed between the conductor surface and an insulating layer.

Figure 10:
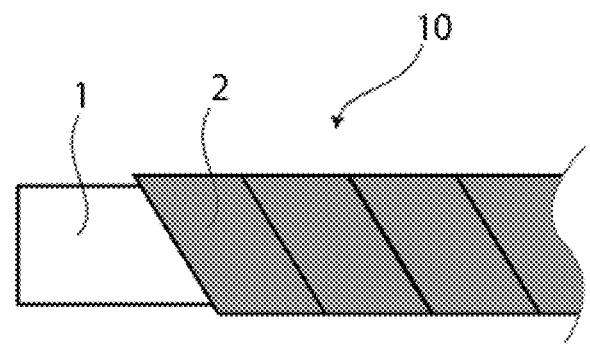
FIG. 10 is a schematic diagram of another insulated electric wire according to an embodiment of the present invention.

FIG. 10 shows, as another structure of the laminate 10 of the present invention, an insulated electric wire formed by winding around a conductor 1 an insulating film formed of a resin composition for forming an insulating coating 2. The insulating film can be formed by shaping the resin composition (insulating paint) for forming the insulating coating 2 using a film coater or the like, and baking the resin composition. This method of forming an insulated electric wire includes a method in which the insulating coating 2 is formed on the conductor; and a method in which an insulating film is formed independently and then wound around the conductor. The insulating film corresponds to the insulating coating 2 in the form of a film.

The material constituting the conductor 1 may be any conductive material, for example, a metal such as copper (e.g., low-oxygen copper, oxygen-free copper, or a copper alloy), aluminum, silver, nickel, or iron. The material constituting the conductor 1 may be selected appropriately according to the purpose of the present invention.

The insulating coating 2 is formed of a resin composition containing a resin and a metal oxide hydrate. The resin may be a highly heat-resistant resin, and may, for example, be a resin that is used for known insulated electric wires and the like. Specific examples of the resin include a formal resin, a polyurethane, an epoxy resin, a polyester, a polyamide, a polyester-imide, a polyetherimide, a polyamide-imide, a polyimide, and precursors thereof. Among the above, a polyester-imide, a polyamide-imide, a polyimide, and a precursor of a polyimide are preferably used in order to improve the heat resistance. The polyimide may be an aromatic polyimide obtained by dehydration condensation of a known diamine and an acid anhydride. Examples of the known diamine include 4,4'-diaminodiphenyl ether, and examples of the acid anhydride include pyromellitic anhydride and biphenyltetracarboxylic dianhydride. The insulating coating 2 may contain a single resin or two or more resins as the resin.

In the preparation of the below-described insulating paint for forming the insulating coating 2, the resin may be used in the form of a solution or dispersion in a solvent (such as a resin varnish). A metal oxide hydrate is dispersed in the insulating paint used to form the insulating coating 2.

The amount of the resin contained in the insulating coating 2 is preferably 50% by mass or more, and more preferably 60% by mass or more, while it is preferably 94% by mass or less, more preferably 90% by mass or less, and still more preferably 85% by mass or less, in order to allow an inorganic insulating layer 5 to be satisfactorily formed upon partial discharge to provide a laminate having improved partial discharge resistance.

The metal oxide hydrate may be such that, after the insulating coating 2 of the laminate of the present invention is exposed to partial discharge, it forms the below-described inorganic insulating layer 5 on a portion of the region where the insulating coating 2 was previously formed. The metal oxide hydrate is preferably a hydrated alumina, which forms a particularly strong inorganic insulating layer 5. Examples of the hydrated alumina include trihydroxide ($Al(OH)_3$), and two variants of aluminum oxide hydroxide ($AlO(OH)$), i.e., boehmite (γ-aluminum oxide hydroxide) and diaspore (α-aluminum oxide hydroxide). Boehmite is categorized into pseudo-crystalline boehmite and micro-crystalline boehmite, both of which can be used herein without limitation. A single metal oxide hydrate or two or more metal oxide hydrates may be used as the metal oxide hydrate.

When the laminate 10 is exposed to partial discharge caused by inverter surges, the inorganic insulating layer 5 is formed. The inorganic insulating layer 5 is formed of at least one of a metal oxide and a metal oxide hydrate formed by partial dehydration of the metal oxide hydrate contained in the resin composition constituting the insulating coating 2. When the metal oxide hydrate contained in the resin composition constituting the insulating coating 2 is $Al(OH)_3$, examples of the metal oxide and the metal oxide hydrate formed by partial dehydration of the above-described metal oxide hydrate include $Al(OH)_2$, $AlO(OH)$, $Al_2O_3$, and mixtures thereof with $Al(OH)_3$.

The metal oxide hydrate is preferably contained in the form of fine particles in the insulating coating 2. The metal oxide hydrate is uniformly dispersed in the insulating coating 2, and preferably has a particle diameter of, for example, 100 nm or less. The metal oxide hydrate is preferably in the shape of flat fine particles having a high aspect ratio (one side/thickness), which facilitates forming the inorganic insulating layer 5, and the aspect ratio is preferably 4 to 200.

The metal oxide hydrate is preferably uniformly dispersed with a nano-size in the insulating coating 2. The dispersed state of the metal oxide hydrate can be observed by TEM, and is preferably such that, for example, agglomerated particles with a particle diameter not less than 5 times the particle diameter of the metal oxide hydrate are not observed. The presence of such agglomerated particles may cause concentration of partial discharge at the agglomerated region, possibly leading to dielectric breakdown without the inorganic insulating layer 5 being formed. As used herein, the nano-size refers to a dispersed particle diameter of 500 nm or less.

The method of mixing the metal oxide hydrate and the resin is not limited as long as it allows the metal oxide hydrate to be uniformly dispersed in the insulating coating 2. It is, however, preferred to use a metal oxide hydrate sol. The use of a metal oxide hydrate sol facilitates uniformly dispersing the metal oxide hydrate in the insulating coating 2. If a metal oxide hydrate powder or gel is used, an agglomerate of the metal oxide hydrate may form in the insulating coating. This may cause concentration of partial discharge at the agglomerated region, possibly leading to dielectric breakdown without the inorganic insulating layer 5 being formed.

The amount of the metal oxide hydrate contained in the insulating coating 2 is preferably 6 parts by mass or more, more preferably 10 parts by mass or more, and still more preferably 15 parts by mass or more, per 100 parts by mass of the resin, in order to allow the inorganic insulating layer 5 to be satisfactorily formed upon partial discharge to provide a laminate having improved partial discharge resistance. The upper limit of the amount of the metal oxide hydrate is preferably 100 parts by mass or less, and more preferably 70 parts by mass or less. If the amount of the metal oxide hydrate is less than 6 parts by mass, dielectric breakdown may possibly occur before the inorganic insulating layer 5 is formed. If the amount of the metal oxide hydrate is above 100 parts by mass, the insulating coating 2 may lose flexibility, possibly resulting in reduced flexibility.

In the preparation of the below-described insulating paint for forming the insulating coating 2, it is preferred that the resin be dissolved or dispersed in a solvent, and the metal oxide hydrate be dispersed in the solvent, in the insulating paint. The insulating coating 2 is formed by applying the insulating paint, followed by baking. High-boiling-point solvents are typically suitably used as the solvent, including cresol-based phenols, aromatic alcohols, NMP (N-methyl-2-pyrrolidone), DMAC (N,N-dimethylacetamide), DMF (N,N-dimethylformamide), DMI (1,3-dimethyl-2-imidazolidinone), carbonate-based solvents, lactone-based solvents, and glycol ether-based solvents. The insulating paint may contain a small amount of an acid component or an alkali component to stabilize the dispersion. The insulating paint may also contain water, a low-boiling-point alcohol, or a low-viscosity solvent or the like that contributes to reducing the viscosity of the insulating paint. Optionally, the insulating paint may be mixed with other metal oxides or silicon oxides, or may contain a dispersant or a surface-treating agent added to impart hydrophobicity or improve the dispersibility.

When the laminate 10 of the present invention is exposed to partial discharge caused by inverter surges, the inorganic insulating layer 5 is formed on a portion of the insulating coating 2. More specifically, as shown in the schematic diagrams of FIGS. 6 and 7, when the laminate 10 is exposed to partial discharge caused by inverter surges, the inorganic insulating layer 5 (21) is formed on a region 2a where partial discharge occurred in the insulating coating 2. In the region 2a where partial discharge occurred in the insulating coating 2, the insulating coating 2 is slightly eroded by partial discharge.

The inorganic insulating layer 5 is formed, for example, on a portion of the side opposite to the conductor 1 side of the insulating coating 2. In this case, therefore, after the laminate 10 of the present invention is exposed to partial discharge caused by inverter surges, and the inorganic insulating layer 5 is formed, the laminate 10 of the present invention is a laminate 10 including at least the conductor 1, the insulating coating 2 formed on the perimeter of the conductor 1, and the inorganic insulating layer 5 formed on a portion of the side opposite to the conductor 1 side of the insulating coating 2.

Furthermore, the below-described composite layer 6 is formed, for example, between the insulating coating 2 and the inorganic insulating layer 5. In this case, therefore, after the laminate 10 of the present invention is exposed to partial discharge caused by inverter surges, and the inorganic insulating layer 5 and the composite layer 6 are formed, the laminate 10 of the present invention is a laminate 10 including at least the conductor 1, the insulating coating 2 formed on the perimeter of the conductor 1, the composite layer 6 formed on a portion of the side opposite to the conductor 1 side of the insulating coating 2, and the inorganic insulating layer 5 formed on a portion of the side opposite to the conductor 1 side of the composite layer 6.

Figure 6:
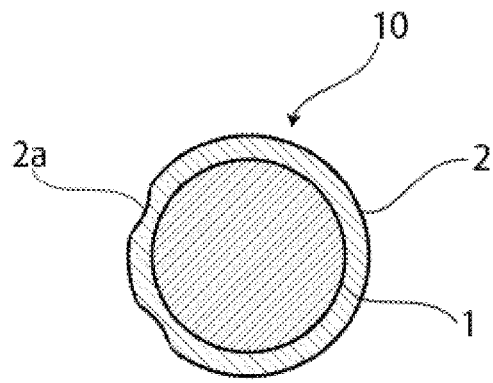
FIG. 6 is a schematic cross-sectional view showing the state of an insulating coating after partial discharge occurred in the laminate shown in FIG. 1.
Figure 7:
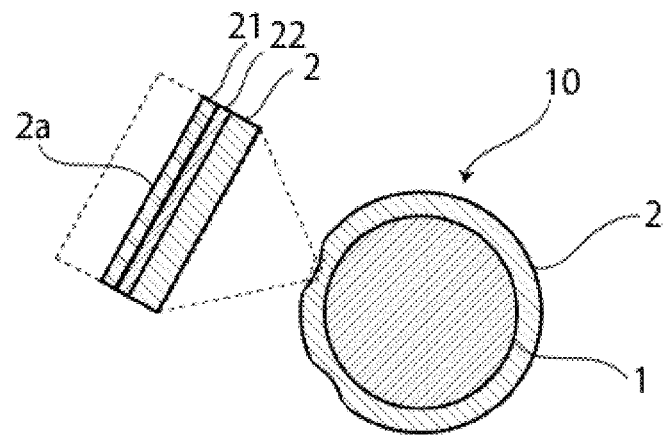
FIG. 7 is an enlarged schematic view of a region where partial discharge occurred in the insulating coating, in the laminate shown in FIG. 6.

FIG. 7 is an enlarged schematic view of the region 2a where partial discharge occurred in the insulating coating 2, in the laminate 10 shown in FIG. 6. As is seen in the enlarged region 2a where partial discharged occurred in the laminate 10, the inorganic insulating layer 5 (21) is formed that is based on a metal oxide or a metal oxide hydrate formed by partial dehydration of the starting-material metal oxide hydrate contained in the insulating coating 2. FIG. 7 also shows that the composite layer 6 (22) is formed between the insulating coating 2 and the inorganic insulating layer 5. The composite layer 6 contains a mixture of the materials constituting the insulating coating 2 and the inorganic insulating layer 5. That is, the composite layer 6 contains a mixture of the resin and the metal oxide hydrate contained in the insulating coating 2, and the metal oxide or the metal oxide hydrate formed by partial dehydration of the above-described metal oxide hydrate contained in the inorganic insulating layer 5. The proportion of the resin contained in the composite layer 6 is smaller than the proportion of the resin contained in the insulating coating 2. Furthermore, the composite layer 6 contains voids. The voids in the composite layer 6 are formed by the elimination of a portion of the resin due to partial discharge.

In the laminate 10 of the present invention, the inorganic insulating layer 5 formed upon partial discharge is observed as a visually identifiable white layer, for example.

To provide a laminate having excellent partial discharge resistance, the thickness of the inorganic insulating layer 5 is, for example, 10 nm or more, preferably 30 nm or more, and more preferably 50 nm or more. When the thickness of the inorganic insulating layer 5 is 10 nm or more, the electrical insulation lifetime is sharply increased. That is, the inorganic insulating layer 5 achieves a significant effect of acting as a barrier against partial discharge to prevent dielectric breakdown due to partial discharge. As described above, the inorganic insulating layer 5 is formed simultaneously with the elimination of the resin. The thickness of the inorganic insulating layer 5 varies with factors such as the amount of the resin eliminated by partial discharge, the amount of the metal oxide hydrate, and the designed thickness of the insulating coating 2 and the actually applied electric field strength. The upper limit of the thickness of the inorganic insulating layer 5 is, for example, 5 µm.

For example, in the case of making an insulation design of the coil of an electrical apparatus (such as a rotating electric machine), the required thickness of the inorganic insulating layer 5 is determined by the actually applied electric field strength and the guaranteed lifetime of the electrical apparatus. The thickness is designed appropriately to achieve thicknesses of the insulating coating 2 and also the inorganic insulating layer 5 suitable for the type of the electrical apparatus.

The inorganic insulating layer 5 may contain voids, and the void ratio of the inorganic insulating layer 5 is preferably lower than 20%. As the inorganic insulating layer 5 becomes denser with a void ratio lower than 20%, the effect of preventing dielectric breakdown due to partial discharge becomes more significant.

The composite layer 6 is assumed to be a precursor phase to the formation of the inorganic insulating layer 5. The composite layer 6 is a layer having a void ratio higher than that of the inorganic insulating layer 5, and hence, can provide a high heat insulation effect. Therefore, a higher heat insulation effect is expected with increasing thickness of the composite layer 6. The void ratio of the composite layer 6 is preferably 20% or more, and more preferably 30% or more. The upper limit of the void ratio of the composite layer 6 is 80%, for example. The thickness of the composite layer 6 is, for example, 10 nm or more, preferably 50 nm or more, and more preferably 100 nm or more. When the thickness of the composite layer 6 is 10 nm or more, the heat insulation effect becomes higher, and dielectric breakdown is further prevented. This can markedly increase the electrical insulation lifetime, in combination with the partial discharge resistance imparted by the inorganic insulating layer 5.

Figure 8:
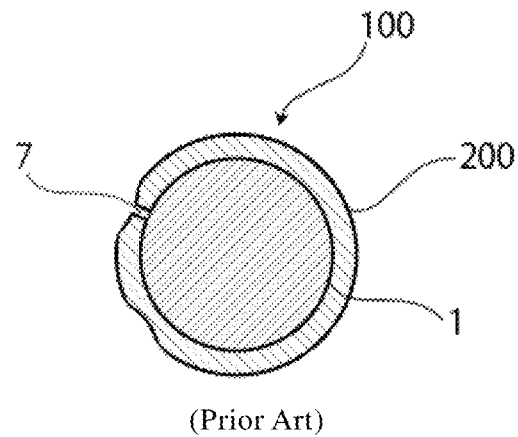
FIG. 8 is a schematic cross-sectional view showing the state of an insulating coating after partial discharge occurred (dielectric breakdown region) in a conventional insulated electric wire.
Figure 9:
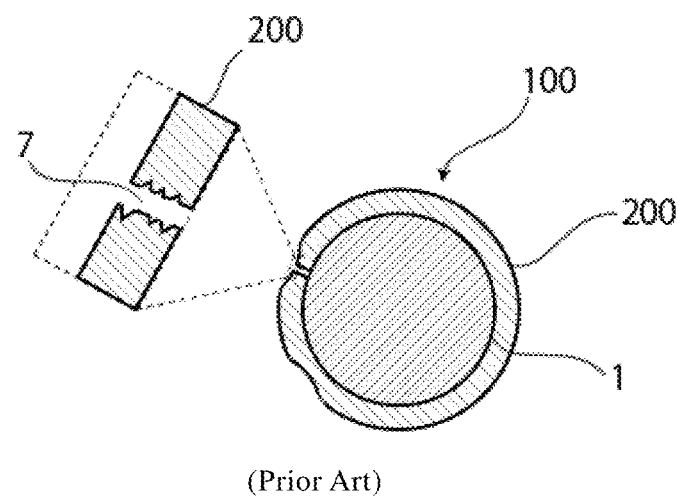
FIG. 9 is an enlarged schematic view of the dielectric breakdown region of the insulating coating shown in FIG. 8.

FIGS. 8 and 9 are each a schematic cross-sectional view showing the state of an insulating coating 200 after partial discharge occurred (dielectric breakdown region) in a conventional insulated electric wire 100. In the conventional insulated electric wire 100 also, the insulating coating 200 formed of a resin is formed, and a dielectric breakdown region 7 is formed upon partial discharge, resulting in significantly reduced insulating properties. In the schematic diagram shown in FIG. 9, the dielectric breakdown region 7 penetrates the insulating coating 200, exposing the surface of the conductor 1 to the outside. In the conventional insulated electric wire 100, the inorganic insulating layer 5 and the composite layer 6 are not formed.

The laminate 10 of the present invention can be produced by laminating at least the insulating coating 2 on the conductor 1. The insulating coating 2 can be formed by applying the above-described insulating paint containing a resin and a metal oxide hydrate, followed by baking. For example, when the insulating coating 2 is to be laminated on the surface of the conductor 1, the insulating paint for forming the insulating coating 2 is applied on the surface of the conductor 1 and baked to form the insulating coating 2.

Examples of methods of applying the insulating paint include a method in which the insulating paint is applied with a coater; a method in which the insulting paint is repeatedly applied and dried with a dip coater or a die to obtain a coating with a predetermined thickness; and spray coating. Baking may be performed by heating at a high temperature (for example, 300° C. or more) for a predetermined time. The insulating coating 2 may also be formed by repeating a series of application and heating operations a plurality of times until a predetermined thickness of the insulating coating 2 is achieved. The baking temperature and time are adjusted according to the type of the metal oxide hydrate, such that the metal oxide hydrate does not alter to another metal oxide hydrate or metal oxide.

The inorganic insulating layer 5 of the present invention is formed on a portion of the insulating coating 2 when the laminate is exposed to partial discharge caused by inverter surges. This partial discharge occurs, for example, at a frequency of 1 to 100 kHz and a voltage of 600 V to 3 kV.

For example, when the laminate 10 of the present invention is in the form of an insulated electric wire, the insulated electric wire can be produced by applying the insulating paint onto the perimeter of the conductor 1 or onto another layer that covers the perimeter of the conductor 1, followed by baking. The insulating coating 2 can be formed by repeating a plurality of times (for example, 10 to 20 times) a series of operations (application and heating) of applying the insulating paint onto the perimeter of the conductor 1 at a predetermined thickness, and heating at a high temperature (for example, from 300 to 500° C. or more) for a predetermined time (for example, 1 to 2 minutes), until a predetermined thickness of the insulating coating 2 is achieved.

The coil of the present invention can be formed by winding the above-described insulated electric wire around a core. The rotating electric machine of the present invention is a rotating electric machine in which the coil of the present invention is used for a motor or the like. That is, the rotating electric machine of the present invention may be produced using the insulated electric wire of the present invention, or may be produced by forming a rotating electric machine using the conductor 1, and then forming the insulating coating 2 on the surface of the conductor 1 to form an electric wire.

Examples of the rotating electric machine include motors and generators.

Furthermore, by virtue of its excellent partial discharge resistance, the laminate of the present invention can be used as a flexible circuit board or an acoustic member. Examples of flexible circuit boards include flexible printed circuit boards. When the laminate of the present invention is used as a flexible circuit board, the flexible circuit board can be produced by applying the insulating paint onto the surface of a conductor or onto another layer that covers the surface of a conductor, followed by baking. Examples of acoustic members include resin films for speaker diaphragms.

EXAMPLES

The present invention will be described in more detail with examples.

(Polyimide Paint 1)

Production Example 1

In a 10-L four-neck flask equipped with a stirrer and a thermometer, 400.8 g of 4,4'-diaminodiphenylether and 4109 g of NMP were placed, and dissolved by heating to 40° C. with stirring under nitrogen. Subsequently, 220.0 g of pyromellitic anhydride and 279.5 g of biphenyltetracarboxylic dianhydride were gradually added to the solution. After the completion of the addition, the mixture was stirred for 1 hour to obtain a polyimide paint in which an aromatic polyamic acid represented by formula (I) below was dissolved at a concentration of 18.0% by mass. In formula (I) below, n is an integer of 2 or more.

[Formula 1]

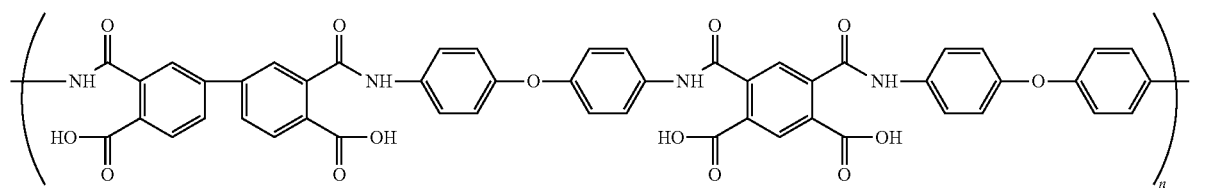

(I)

(Polyimide Paint 2)

Production Example 2

In a 10-L four-neck flask equipped with a stirrer and a thermometer, 400.5 g of 4,4'-diaminodiphenylether and 3780 g of NMP were placed, and dissolved by heating to 40° C. with stirring under nitrogen. Subsequently, 425.2 g of pyromellitic anhydride was gradually added to the solution. After the completion of the addition, the mixture was stirred for 1 hour to obtain a polyimide paint in which an aromatic polyamic acid represented by formula (II) below was dissolved at a concentration of 17.9% by mass. In formula (II) below, n is an integer of 2 or more.

[Formula 2]

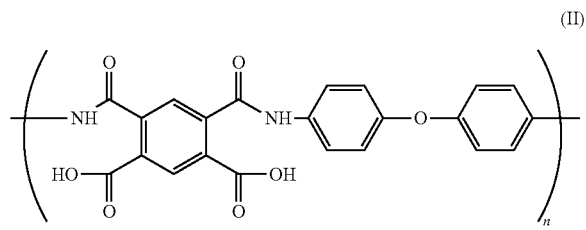

(II)

(Polyimide Paint 3)
UPIA (registered trademark)-AT (U-varnish-A) available from Ube Industries, Ltd. was used. This product is a polyimide paint formed of an aromatic polyamic acid obtained by reacting 4,4'-diaminodiphenyl ether and biphenyltetracarboxylic dianhydride.
(Polyamide-imide Paint)

Production Example 3

In a 3-L four-neck flask equipped with a stirrer and a thermometer, 192.1 g of trimellitic anhydride, 255.3 g of 4,4'-diphenylmethane diisocyanate, and 1210 g of NMP were placed, and the contents were heated to 160° C. with stirring under nitrogen and reacted for 1 hour. Subsequently, 2 g of methanol was added to terminate the reaction, and the reaction product was cooled to obtain a polyamide-imide paint in which the polyamide-imide was dissolved at a concentration of 25.1% by mass.
(Polyester-imide Paint)
Neoheat 8600 available from Totoku Toryo Co., Ltd. was used.
<Production of Insulating Paints>
Insulating paints each having the composition shown in Table 1 were produced as described below.

Example 1

The polyamide-imide paint 1 was mixed with 20 parts by mass of flat particles of an aluminum hydroxide ($Al(OH)_3$) (average particle diameter: 30 nm, thickness: about 1 to 5 nm, aspect ratio (one side/thickness): 6 to 30) as a hydrated alumina, relative to 80 parts by mass of the resin, and the aluminum hydroxide was uniformly dispersed to obtain an insulating paint. A sol previously prepared by dispersing the aluminum hydroxide in NMP solvent was used during mixing.

Example 2

The polyester-imide paint was mixed with 20 parts by mass of flat particles of an aluminum hydroxide ($Al(OH)_3$) (average particle diameter: 100 nm, thickness: about 2 to 5 nm, aspect ratio (one side/thickness): 20 to 50) as a hydrated alumina, relative to 80 parts by mass of the resin, and the aluminum hydroxide was uniformly dispersed to obtain an insulating paint. A sol previously prepared by dispersing the aluminum hydroxide in a solvent mixture of a meta/para-cresol mixture and an aromatic hydrocarbon was used during mixing.

Example 3

The polyimide paint 1 was mixed with 20 parts by mass of rectangular flat particles of boehmite (particle diameter: about 10 nm×50 nm, thickness: about 1 to 5 nm, aspect ratio (long side/thickness): 10 to 50) as a hydrated alumina, relative to 80 parts by mass of the resin, and the boehmite was uniformly dispersed to obtain an insulating paint. A sol previously prepared by dispersing the boehmite in NMP was used during mixing. To prevent gelling, 6 parts by mass of phosphoric acid ethyl ester (ethyl acid phosphate (Ethyl Phosphate (Mono- and Di-Ester mixture) available from Tokyo Chemical Industry Co., Ltd.; monoester content: 35.0 to 47.0%; diester content: 53.0 to 67.0%)), relative to 100 parts by mass of the boehmite, was added to the boehmite sol.

Example 4

The polyimide paint 1 was mixed with 20 parts by mass of flat particles of boehmite (average particle diameter: 20 nm, thickness: about 1 to 5 nm, aspect ratio (one side/thickness): 4 to 20) as a hydrated alumina treated with a methacrylic silane coupling agent (KBM-503; Shin-Etsu Silicone), relative to 80 parts by mass of the resin, and the boehmite was uniformly dispersed to obtain an insulating paint. A sol previously prepared by dispersing the boehmite in a solvent mixture of ethanol and NMP was used during mixing. To prevent gelling, the boehmite sol was adjusted to have an ethanol-to-NMP ratio of 40 to 60 parts by mass.

Example 5

The polyamide-imide paint was mixed with 10 parts by mass of rectangular flat particles of boehmite (particle diameter: about 10 nm×50 nm, thickness: about 1 to 5 nm, aspect ratio (long side/thickness): 10 to 50) as a hydrated alumina, relative to 90 parts by mass of the resin, and the boehmite was uniformly dispersed to obtain an insulating paint. A sol previously prepared by dispersing the boehmite in a solvent mixture of NMP, γ-butyrolactone, and ethanol was used during mixing. To prevent gelling, 5 parts by mass of phosphoric acid ethyl ester (ethyl acid phosphate (Ethyl Phosphate(Mono- and Di-Ester mixture) available from Tokyo Chemical Industry Co., Ltd.; monoester content: 35.0 to 47.0%; diester content: 53.0 to 67.0%)), relative to 100 parts by mass of the boehmite, was added to the boehmite sol.

Example 6

An insulating paint was obtained as in Example 3, except that the polyimide paint 1 was replaced by the polyimide paint 2.

Example 7

An insulating paint was obtained as in Example 3, except that the polyimide paint 1 was replaced by the polyimide paint 3.

Example 8

An insulating paint was obtained as in Example 3, except that the polyimide paint 1 was mixed with 15 parts by mass of the hydrated alumina, relative to 85 parts by mass of the resin. The insulating paint was applied to a copper conductor (diameter: about 1 mm), and baked for about 1 minute while the temperature was continuously increased from an inlet temperature of 350° C. to an outlet temperature of 420° C. This process was repeated to produce an electric wire having a 38-μm-thick insulating coating (hydrated alumina concentration: 15% by mass) on the surface of the copper conductor (diameter: about 1 mm).

Comparative Example 1

The polyamide-imide paint 1 was mixed with 20 parts by mass of spherical particles of alumina (average particle diameter: 20 nm), relative to 80 parts by mass of the resin, and the alumina was uniformly dispersed to obtain an insulating paint. A sol previously prepared by dispersing the alumina in NMP was used during mixing.

Comparative Example 2

The polyimide paint 1 was mixed with 20 parts by mass of silica (average particle diameter: 13 nm, spherical), relative to 80 parts by mass of the resin, and the silica was uniformly dispersed to obtain an insulating paint. A silica sol previously prepared by dispersing the silica in NMP was used during mixing.

Comparative Example 3

The polyimide paint 1 was mixed with talc particles (average particle diameter: 0.6 μm, plate-like) to give 20 parts by mass of talc, relative to 80 parts by mass of the resin, and the talc particles were uniformly dispersed to obtain an insulating paint.

Comparative Example 4

The polyimide paint 1 was mixed with zinc oxide fine particles (average particle diameter: 35 nm, spherical) to give 20 parts by mass of the zinc oxide, relative to 80 parts by mass of the resin, and the zinc oxide fine particles were uniformly dispersed to obtain an insulating paint.

Comparative Example 5

An insulating paint was obtained as in Example 2, except that the aluminum hydroxide was not used.

Comparative Example 6

An insulating paint was obtained as in Example 1, except that the aluminum hydroxide was not used.

Comparative Example 7

An insulating paint was obtained as in Example 3, except that the boehmite was not used.

Comparative Example 8

An insulating paint obtained as in Comparative Example 7 was applied to a copper conductor (diameter: about 1 mm), and baked for about 1 minute while the temperature was continuously increased from an inlet temperature of 350° C. to an outlet temperature of 420° C. This process was repeated to produce an electric wire having a 38-μm-thick insulating coating on the surface of the copper conductor (diameter: about 1 mm).

Comparative Example 9

The polyester-imide paint was mixed with 20 parts by mass of silica (average particle diameter: 13 nm, spherical), relative to 80 parts by mass of the resin, and the silica was uniformly dispersed to obtain an insulating paint. A silica sol previously prepared by dispersing the silica in NMP was used during mixing. The insulating paint was applied to a copper conductor, and baked for about 1 minute while the temperature was continuously increased from an inlet temperature of 350° C. to an outlet temperature of 420° C. This process was repeated to produce an electric wire having a 38-μm-thick insulating coating (silica concentration: 15% by mass) on the surface of the copper conductor (diameter: about 1 mm).

<Production of Laminates of Conductors and Insulating Coatings>

Laminates (films) of conductors and insulating coatings were produced using the insulating paints obtained in Examples 1 to 7 and Comparative Examples 1 to 7. Specifically, each insulating paint was uniformly applied to the surface of aluminum foil (thickness: 300 μm) serving as a conductor, and baked at a temperature of 300° C. for 1 hour to obtain a film having an insulating coating (thickness: 50 μm) laminated on the surface of the aluminum foil.

<Evaluation of Flexibility>

For the films obtained above, and the electric wires obtained in Example 8, and Comparative Examples 8 and 9, flexibility was evaluated using the method described below. The results are shown in Table 1. For each film, the test was conducted in accordance with the cylindrical mandrel bend test method as defined in JIS K5600-5-1. For each electric wire, the test was conducted in accordance with the winding test as defined in JIS C3216-5-1.

<Partial Discharge Exposure Test and V-t Characteristic Evaluation>

Figure 15:
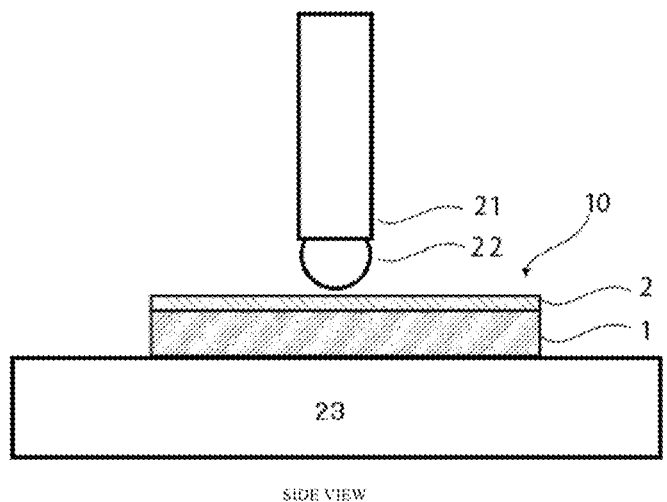
FIG. 15 is a schematic diagram for explaining the partial discharge exposure test and the V-t characteristic evaluation method.

For each film obtained above, a partial discharge exposure test and a V-t characteristic evaluation (voltage-partial discharge lifetime characteristic test) were conducted using the method described below. In the testing method, a voltage was applied across an electrode and each film, using a rod electrode. Specifically, the testing method was as follows: As shown in FIG. 15, sequentially from below, on a stainless steel support 23, an aluminum sheet 1 covered with the insulating coating 2 was mounted. A metal ball 22 (2 mm in diameter) and a copper tube 21 were sequentially placed thereon, and fixed to press under their own weight. The copper tube 21 and the aluminum sheet (conductor 1) were connected to a power supply, such that the metal ball 22 served as a high-voltage electrode and the aluminum sheet (conductor 1) as a low-voltage electrode. The voltage was applied by generating bipolar square waves at a pulse width of 5 μs and a frequency of 10 kHz, using the inverter pulse generator PG-W03KP-A available from Nissin Pulse Electronics Co., Ltd.

For each electric wire, a partial discharge exposure test and a V-t characteristic evaluation (voltage-partial discharge lifetime characteristic test) were conducted using the method described below. Using each electric wire, a twisted pair sample was produced in accordance with JIS C 3216, and a voltage was applied across the two wires. The voltage was applied by generating bipolar square waves at a pulse width of 5 μs and a frequency of 10 kHz, using the inverter pulse generator PG-W03KP-A available from Nissin Pulse Electronics Co., Ltd.

In the observation of partial discharge exposure, a (visual) test for the presence/absence of the inorganic insulating layer involved visually observing an eroded region after the V-t test at 1.5 kVp. A (visual) test for the presence/absence of the inorganic layer after tape peel test involved carrying out a tape peel test in accordance with JIS H 8504 on the eroded region of the sample after the (visual) test for the presence/absence of the inorganic insulating layer, and visually observing the sample after the test. The thicknesses of the inorganic insulating layer and the composite layer were measured by continuously applying a voltage of 2.0 kVp for 100 hours, embedding a partial discharge-induced eroded region of the coating in resin, cutting the cross section into thin pieces by FIB (gallium focused ion beam), checking the presence/absence of the inorganic insulating layer and the composite layer by TEM (transmission electron microscopy), and then measuring the thicknesses of the layers. The results are shown in Table 1.

In the V-t characteristic test, a voltage of 1.5, 2.0, or 2.5 kVp was applied, and the time to dielectric breakdown of the sample was measured. The results are shown in Table 1.

TABLE 1

| | | | | Example 1 | Example 2 | Example 3 | Example 4 Laminate (Film) | Example 5 | Example 6 | Example 7 | Example 8 Electric Wire |
|---|---|---|---|---|---|---|---|---|---|---|---|
| Composition of Insulating Paint | Resin | Polyester-imide | | | 80 | | | | | | |
| | | Polyamide-imide | | 80 | | | | 90 | | | |
| | | Polyimide | | | | 80 | 80 | | 80 | 80 | 85 |
| | Metal Oxide Hydrate | Aluminum hydroxide (Al(OH)3) | Average particle diameter: 30 nm, aspect ratio (one side/thickness): 6-30, flat | 20 | | | | | | | |
| | | | Average particle diameter: 100 nm, aspect ratio (one side/thickness): 20-50, flat | | 20 | | | | | | |
| | | Boehmite | Particle diameter: about 10 × 50 nm, aspect ratio (long side/thickness): 10-50, rectangular flat | | | 20 | | | 20 | 20 | 15 |
| | | | Average particle diameter: 20 nm, aspect ratio (one side/thickness): 4-20, flat, surface treatment: methacrylic silane | | | | 20 | | | | |
| | | | Particle diameter: about 10 × 50 nm, aspect ratio (long side/thickness): 10-50, rectangular flat | | | | | 10 | | | |
| | Metal Oxide | Alumina | Average particle diameter: 20 nm, spherical | | | | | | | | |
| | | Silica | Average particle diameter: 12 nm, spherical | | | | | | | | |
| | | Talc particles | Average particle diameter: 0.6 μm, plate-like | | | | | | | | |
| | | Zinc oxide fine particles | Average particle diameter: 35 nm, spherical | | | | | | | | |

TABLE 1-continued

| | | | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|---|---|
| | | | | | | | Laminate (Film) | | | | | Electric Wire |
| Composition of Insulating Paint | Resin | Polyester-imide | | | | | | 100 | | | | |
| | | Polyamide-imide | | 80 | | | | | 100 | | | 80 |
| | | Polyimide | | | 80 | 80 | 80 | | | 100 | 100 | |
| | Metal Oxide Hydrate | Aluminum hydroxide (Al(OH)3) | Average particle diameter: 30 nm, aspect ratio (one side/thickness): 6-30, flat | | | | | | | | | |
| | | | Average particle diameter: 100 nm, aspect ratio (one side/thickness): 20-50, flat | | | | | | | | | |
| | | Boehmite | Particle diameter: about 10 × 50 nm, aspect ratio (long side/thickness): 10-50, rectangular flat | | | | | | | | | |
| | | | Average particle diameter: 20 nm, aspect ratio (one side/thickness): 4-20, flat, surface treatment: methacrylic silane | | | | | | | | | |
| | | | Particle diameter: about 10 × 50 nm, aspect ratio (long side/thickness): 10-50, rectangular flat | | | | | | | | | |
| | Metal Oxide | Alumina | Average particle diameter: 20 nm, spherical | 20 | | | | | | | | |
| | | Silica | Average particle diameter: 12 nm, spherical | | 20 | | | | | | | 20 |
| | | Talc particles | Average particle diameter: 0.6 μm, plate-like | | | | 20 | | | | | |
| | | Zinc oxide fine particles | Average particle diameter: 35 nm, spherical | | | | | 20 | | | | |
| Evaluation | Flexibility | Mandrel (film) acceptable winding diameter (electric wire) | | 2 mm | 2 mm | 2 mm | 2 mm | 2 mm | 2 mm | 2 mm | 2 mm | 1 d |
| | Result of observation of eroded region after partial discharge exposure test | (Visual) presence absence of inorganic insulating layer | Square wave at 10 kHz and 1.5 kVp | Present | Present | Present | Present | Present | — | — | — | Present |
| | | (Visual) presence absence of inorganic insulating layer after tape peel test | | Present | Present | Present | Present | Present | — | — | — | Present |
| | | Presence absence of inorganic insulating layer (TEM) | Square wave at 10 kHz and 2.0 kVp | — | — | Present | — | — | — | — | — | Present |
| | | Presence absence of composite layer (TEM) | | — | — | Present | — | — | — | — | — | Present |
| | | Thickness (nm) of inorganic insulating | | — | — | 160 | — | — | — | — | — | 30 |

TABLE 1-continued

| | | | | | | | | | | | |
|---|---|---|---|---|---|---|---|---|---|---|---|
| | | layer Thickness (nm) of composite layer | — | — | 100 | — | — | — | — | — | 170 |
| | V-t characteristic (h) | Square wave at 10 kHz and 2.5 kVp | — | — | 157 | 135 | 25 | — | — | — | 37 |
| | | Square wave at 10 kHz and 2.0 kVp | — | — | 909 | 396 | 121 | — | — | — | 656 |
| | | Square wave at 10 kHz and 1.5 kVp | 1000< | 1000< | 1500< | 1000< | 454 | — | — | — | 1500< |
| Evaluation | Flexibility | Mandrel (film) acceptable winding diameter (electric wire) | 2 mm | 2 mm | 2 mm | 2 mm | 2 mm | 2 mm | 2 mm | 1 d | 1 d |
| | Result of observation of eroded region after partial discharge exposure test | (Visual) presence absence of inorganic insulating layer | Square wave at 10 kHz and 1.5 kVp | Present | Present | Present | Present | Absent | Absent | Absent | Absent | Partially present*[2] |
| | | (Visual) presence absence of inorganic insulating layer after tape peel test | | Absent | Absent | Absent | Absent | Absent | Absent | Absent | Absent | Absent |
| | | Presence absence of inorganic insulating layer (TEM) | Square wave at 10 kHz and 2.0 kVp | — | Present | — | — | — | — | — | — | — |
| | | Presence absence of composite layer (TEM) | | — | Absent | — | — | — | — | — | — | — |
| | | Thickness (nm) of inorganic insulating layer | | — | About 2 μm*[1] | — | — | — | — | — | — | — |
| | | Thickness (nm) of composite layer | | — | Not observed | — | — | — | — | — | — | — |
| | V-t characteristic (h) | Square wave at 10 kHz and 2.5 kVp | 8 | 16 | — | — | 0.2 | 0.3 | 0.2 | 0.3 | 8 |
| | | Square wave at 10 kHz and 2.0 kVp | 42 | 37 | 0.3 | 5.4 | 0.3 | 0.4 | 0.4 | 0.5 | 19 |
| | | Square wave at 10 kHz and 1.5 kVp | 223 | 262 | 0.7 | 35 | 0.9 | 0.8 | 0.6 | 0.9 | 71 |

In Table 1, "—" denotes that the item was not evaluated.
*[1]Many defects were observed on the surface.
*[2]White smoky matter rose when the twisted pair wire sample after the test was unwound for observation.

Figure 12:
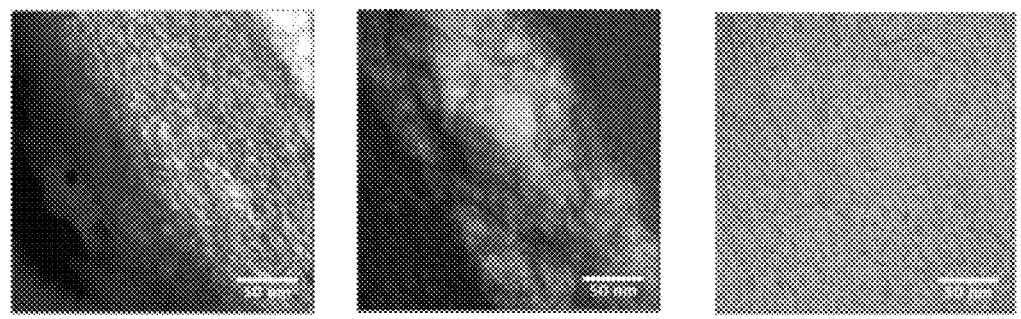
FIG. 12 is an enlarged image of the inorganic insulating layer 5, the composite layer 6, or the insulating coating 2 in sequence from the left, in the TEM image shown in FIG. 11.
Figure 13:
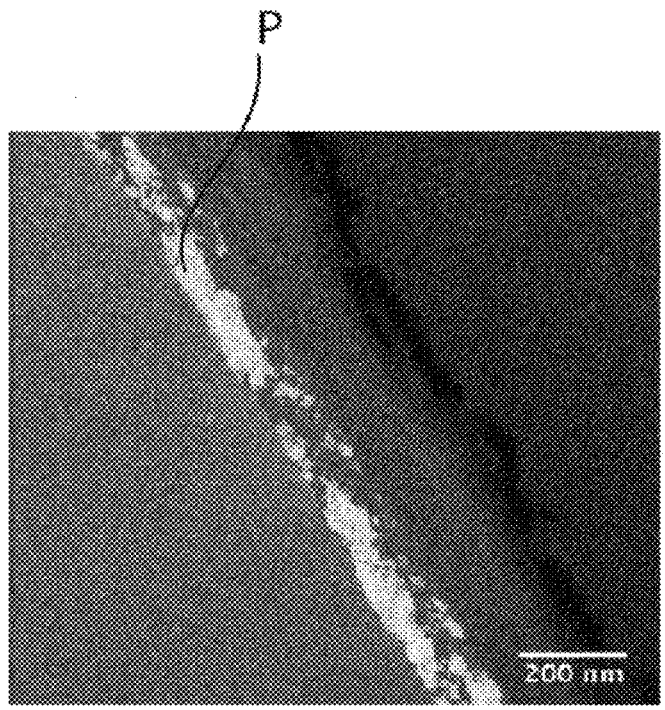
FIG. 13 is a TEM image of a stained region for determining the void ratios of the inorganic insulating layer 5 and the composite layer 6 formed in the film of Example 3.
Figure 16:
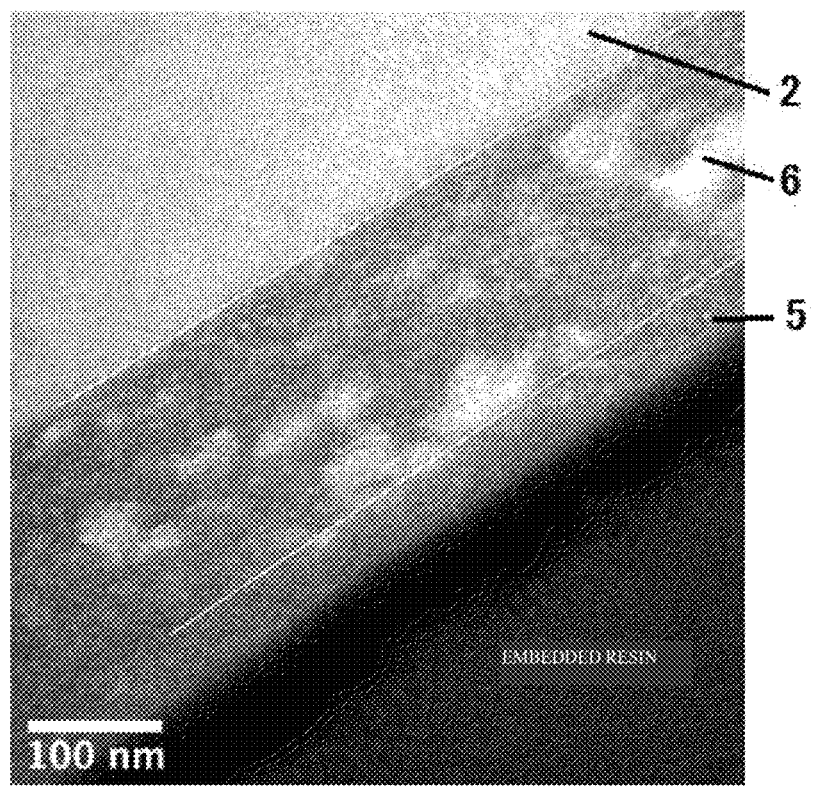
FIG. 16 is a TEM image of a region where partial discharge occurred in the insulating coating of Example 8; for reference, the white lines each indicate the boundary between the composite layer 6 and the insulating coating 2 or the boundary between the composite layer 6 and the inorganic insulating layer 5.

In the observation test of the layer structure by TEM for the film of Example 3, distinctive formation of the inorganic insulating layer and the composite layer was confirmed, as shown in FIGS. 12 and 13. Likewise, in the observation test of the layer structure by TEM for the electric wire of Example 8, distinctive formation of the inorganic insulating layer and the composite layer was confirmed, as shown in FIG. 16. In FIG. 16, for reference, the white lines each indicate the boundary between the composite layer 6 and the insulating coating 2 or the boundary between the composite layer 6 and the inorganic insulating layer 5.

Figure 14:
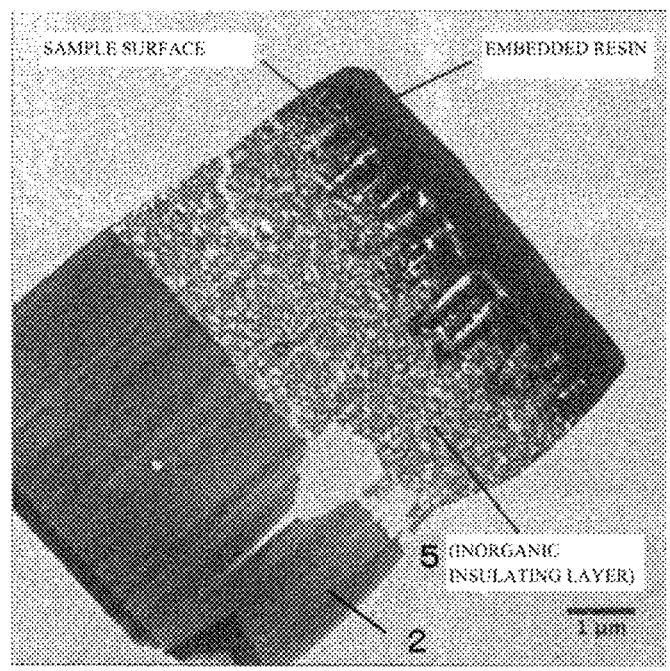
FIG. 14 is a TEM image of a region where partial discharge occurred in the insulating coating of Comparative Example 2.

In contrast, in the comparative examples, the formation of a strong inorganic insulating layer as seen in the examples was not observed on the insulating coatings after partial discharge exposure. In the observation test of the layer structure by TEM measured for the sample of Comparative Example 2, as shown in FIG. 14, although the inorganic insulating layer 5 was observed, it contained numerous voids, and had numerous defective regions on the surface. The composite layer 6 was not observed.

Figure 11:
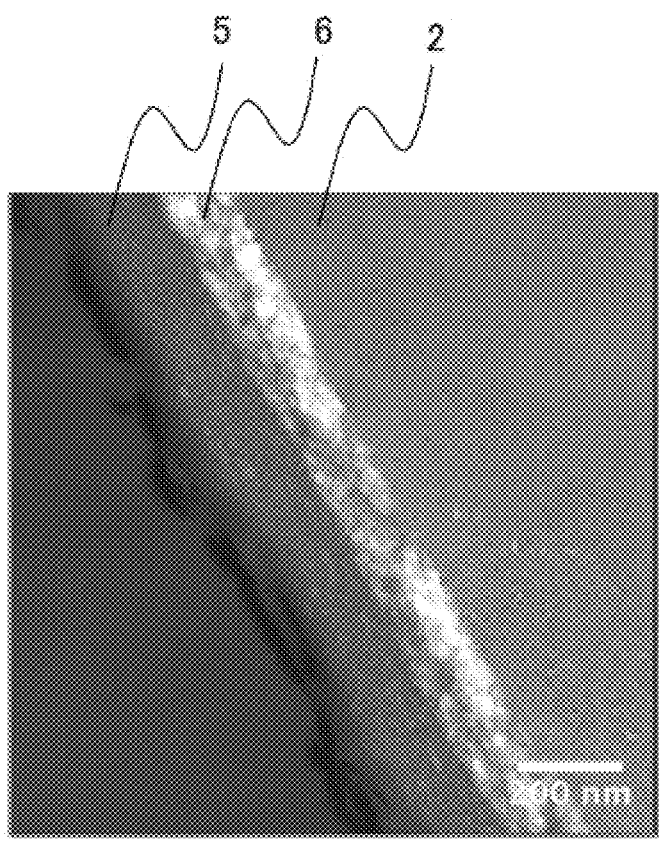
FIG. 11 is a TEM image of a region where partial discharge occurred in the insulating coating of Example 3.

FIG. 11 is a TEM image of a region where partial discharge occurred in the insulating coating of Example 3. In the image shown in FIG. 11, the layer structure as shown in the enlarged schematic view shown in FIG. 7 was observed. The white regions shown in the image indicate voids.

FIG. 12 is an enlarged TEM image of the inorganic insulating layer 5, the composite layer 6, or the insulating coating 2 in sequence from the left, in the image shown in FIG. 11. From the left image in FIG. 12, it can be observed that the inorganic insulating layer 5 is a very dense layer, and the crystals of the inorganic particles are joined together, since each one of the crystals is not seen. From the middle image in FIG. 12, it can be observed that the composite layer 6 is a layer in which voids, the metal oxide hydrate fine particles, and the remaining heat-resistant resin are combined. From the right image in FIG. 12, it is observed that in the insulating coating 2, the metal oxide hydrate fine particles are randomly dispersed in the heat-resistant resin, as in the insulating coating 2 before exposure to partial discharge.

With reference to FIG. 13, staining was performed using image processing to determine the void ratio of the composite layer 6 formed in the film of Example 3, and the ratio of the area of voids P to the area of the whole composite layer 6 was determined. As a result of the calculation, the void ratio of the composite layer 6 was about 42%. Using the same technique, the void ratio of the inorganic insulating layer 5 formed in the film of Example 3 was also determined. As a result, the void ratio was about 5%.

FIG. 14 is a TEM image of a region where partial discharge occurred in the insulating coating of Comparative Example 2. It can be observed that although the inorganic insulating layer 5 is observable, it contains many voids, and is very sparse. It can also be seen that the inorganic insulating layer 5 has numerous defective regions on the surface, and is fragile.

REFERENCE SIGNS LIST

1: Conductor
2: Insulating coating
2a: Region where partial discharge occurred in insulating coating
3: Insulating layer
4: Insulating layer
5: Inorganic insulating layer
6: Composite layer
7: Dielectric breakdown region
10: Laminate
21: Electrode (copper tube)
22: Metal ball
23: Stainless steel support
100: Conventional insulated electric wire
200: Conventional insulating coating
P: Voids

The invention claimed is:

1. A laminate comprising at least a conductor, an insulating coating, a composite layer and an inorganic insulating layer, wherein:
   the insulating coating is formed of a resin composition containing a metal oxide hydrate,
   the resin composition contains the metal oxide hydrate in an amount of 6 to 50 parts by mass per 100 parts by mass of the resin, wherein the metal oxide hydrate is in a shape of flat fine particles having a high aspect ratio (one side/thickness) of 4 to 200,
   the resin in the resin composition is at least one selected from the group consisting of a polyamide-imide, a polyimide, and precursors thereof,
   the inorganic insulating layer is formed on the insulating coating when the laminate is exposed to partial discharge caused by inverter surges occurring due to switching at a frequency of 1 to 100 kHz, and the composite layer is also formed between the conductor and the inorganic insulating layer, wherein a thickness of the inorganic insulating layer is 10 nm or more and wherein a void ratio of the inorganic insulating layer is lower than 20%, and
   the composite layer contains a mixture of the resin and the metal oxide hydrate contained in the insulating coating, and a metal oxide or a metal oxide hydrate formed by dehydration of the metal oxide hydrate contained in the inorganic insulating layer, wherein the composite layer contains voids that are formed upon elimination of a portion of the resin from the composite layer by the partial discharge, wherein a void ratio of the composite layer is 20% or more.

2. The laminate according to claim 1, wherein the metal oxide hydrate is a hydrated alumina.

3. The laminate according to claim 1, wherein the inorganic insulating layer is formed of at least one of a metal oxide and a metal oxide hydrate formed by partial dehydration of the metal oxide hydrate.

4. The laminate according to claim 1, wherein the composite layer has a thickness of 10 nm or more.

5. The laminate according to claim 1, wherein the laminate is in the form of an insulated electric wire or a film.

6. A coil comprising the insulated electric wire according to claim 5.

7. A rotating electric machine comprising the insulated electric wire according to claim 5.

8. An insulating paint comprising the resin composition, for producing the laminate according to claim 1.

9. An insulating film formed from the resin composition, for forming the insulating coating of the laminate according to claim 1.

10. The laminate according to claim 1, wherein the resin composition contains the metal oxide hydrate in an amount of 10 to 50 parts by mass per 100 parts by mass of the resin.

* * * * *